United States Patent
MacLeod et al.

(10) Patent No.: US 6,343,295 B1
(45) Date of Patent: Jan. 29, 2002

(54) DATA LINEAGE

(75) Inventors: Stewart P. MacLeod, Redmond; Casey L. Kiernan, Kirkland; Vij Rajarajan, Issaquah, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/212,218

(22) Filed: Dec. 16, 1998

(51) Int. Cl.[7] .............................................. G06F 17/00
(52) U.S. Cl. ............................. 707/103; 707/6; 707/10; 707/102; 707/101
(58) Field of Search ............................. 707/1, 2, 3, 4, 707/5, 6, 10, 101, 103, 102; 705/28; 709/316

(56) References Cited

U.S. PATENT DOCUMENTS

| | | | | |
|---|---|---|---|---|
| 5,193,185 A | * | 3/1993 | Lanter | 707/101 |
| 5,970,476 A | * | 10/1999 | Fahey | 705/28 |
| 5,991,741 A | * | 11/1999 | Speakman et al. | 705/30 |
| 5,991,751 A | * | 11/1999 | Rivette et al. | 707/1 |
| 6,016,497 A | * | 1/2000 | Suver | 707/103 |
| 6,230,212 B1 | * | 5/2001 | Morel et al. | 709/316 |

OTHER PUBLICATIONS

Practical lineage tracing in data warehouses by Cui et al., Dept. of Computer Science, Stanford University, Proc.; 16th International Conference, pp. 367–368, Feb. 29–Mar. 3, 2000.*

ExploITing data lineage for parellel optimization in external DBMS by Shek, et al, Inf. Sci. Lab., HRL Lab, Malibu, CA, paper in Data Engineering, 1999, Proc. 15th International Conference, p. 256, Mar. 23–26, 1999.*

* cited by examiner

Primary Examiner—Diane D. Mizrahi
(74) Attorney, Agent, or Firm—Woodcock Washburn Kurtz Mackiewicz & Norris LLP

(57) ABSTRACT

A system for tracking the lineage of data in a database. Data within the tables are tracked by attaching lineage information to the data, preferably, by adding a lineage identifier to each row in a table. Data that share a common lineage can be identified by virtue of sharing a common lineage identifier. The lineage identifier can then be used to trace the source of the data, i.e., data having a common identifier share a common history. Additionally, the lineage identifier can provide details about transformations undergone by the data. For example, the lineage identifier can act as a pointer to a detailed history files of operations that were performed on the data to transform it into its current form. Preferably, the lineage identifier tracks program modules as well as specific versions of the program modules that transformed the particular data under consideration.

8 Claims, 12 Drawing Sheets

FIGURE 6

```
' ***********************************************************
' Visual Basic Transformation Script
' Copy each source column to the
' destination column
' ***********************************************************

Function Main()
    DTSDestination("au_id") = DTSSource("au_id")
    DTSDestination("au_lname") = DTSSource("au_lname")
    DTSDestination("au_fname") = DTSSource("au_fname")
    DTSDestination("phone") = DTSSource("phone")
    DTSDestination("address") = DTSSource("address")
    DTSDestination("city") = DTSSource("city")
    DTSDestination("state") = ucase( DTSSource("state") )
    DTSDestination("zip") = DTSSource("zip")
    DTSDestination("contract") = DTSSource("contract")
    DTSDestination("Lineage_Full") = DTSSource("DTSLineage_Full")
    DTSDestination("Lineage_Short") = DTSSource("DTSLineage_Short")
    Main = DTSTransformStat_OK
End Function
```

FIGURE 9

DATA LINEAGE

CROSS REFERENCE TO RELATED APPLICATIONS

This applcation is related by subject matter to the inventions disclosed in commonly assigned U.S. patent application Ser. No 09/212,238, filed on Dec. 16, 1998, entitled "DATA LINEAGE DATA TYPE" and pending U.S. patent application Ser. No. 09/213,069, filed on Dec. 16, 1998, entitled "GRAPHICAL QUERY ANALYZER."

TECHNICAL FIELD

The present invention relates generally to database systems, and more particularly to a system for maintaining lineage information for data stored in a database.

BACKGROUND OF THE INVENTION

A relational database is a collection of related data that is organized in related two-dimensional tables of columns and rows wherein information can be derived by performing set operations on the tables, such as join, sort, merge, and so on. The data stored in a relational database is typically accessed by way of a user-defined query that is constructed in a query language such as Structured Query Language ("SQL"). A SQL query is non-procedural in that it specifies the objective or desired result of the query in a language meaningful to a user but does not define the steps to be performed, or the order of the steps in order to accomplish the query.

Moreover, very large conventional database systems provide a storehouse for data generated from a variety of locations and applications (often referred to as data warehouses or data marts). The quality and reliability of the storehouse is greatly effected by the quality and reliability of its underlying data. Because the data can originate from a variety of sources, the quality and reliability of data will often depend on the quality and reliability of the source. Moreover, the matter is further complicated because individual rows of data within a single table can originate from different sources.

Currently, if the data in a database is questionable, there is no easy way to track the history of the data to determine where it originate or how it may have been changed. As such, it would be advantageous to users of a database to have tools that allow the users to trace aspects of the history (i.e., where the data originated and how the data has been transformed) of the data in a database.

The task of tracing aspects of the history of data in a database is further complicated in enterprise-wide databases (such as data warehouses) where data may flow into the database from direct as well as indirect data sources, (i.e., the data may have been collected from another database that itself directly or indirectly derived the data). In other words, the data may have made multiple "hops" before reaching the destination database of interest.

As such, there is a need for providing method and apparatus for determining information about the history (i.e., lineage) of data contained within a database.

SUMMARY OF THE INVENTION

Briefly, the present invention is directed toward database technology that provides users with powerful tools necessary to manage and exploit data. The present invention provides a system and method for tracking the lineage of data within database tables. According to an aspect of the invention, data within the tables are tracked by attaching lineage information to the data, preferably, by adding a lineage identifier to each row in a table. Data that share a common lineage can be identified by virtue of sharing a common lineage identifier.

The lineage identifier can then be used to trace the source of the data, i.e., data having a common identifier share a common history. Additionally, the lineage identifier can provide details about transformations undergone by the data. For example, the lineage identifier can act as a pointer to a detailed history files of operations that were performed on the data to transform it into its current form. Preferably, the lineage identifier tracks program modules as well as specific versions of the program modules that transformed the particular data under consideration.

As a result of the data lineage mechanism, users can trace the history data in a table, even when that data has made several hops among databases, where the data has undergone one or more transformations, or where the transforming program modules have themselves under gone revision. This provides users with a powerful mechanism to have higher confidence in the quality and reliability of data in a database and to quickly trace and correct errors in the data.

BRIEF DESCRIPTION OF THE DRAWINGS

Other features of the invention are further apparent from the following detailed description of presently preferred exemplary embodiments of the invention taken in conjunction with the accompanying drawings, of which:

FIG. 9 is an ActiveX® script for importing data into a database while adding data lineage information;

DETAILED DESCRIPTION OF THE INVENTION

Overview

The present invention provides a database management system that provides for tracking and tracing the lineage of data stored in a database. The present exemplary embodiments described herein describe the invention in connection with row level lineage. However, the invention is by no means limited to row level lineage, as the invention could be applied on a column basis or a table basis as well.

Exemplary Operating Environment

1. A Computer Environment

Figure 1:
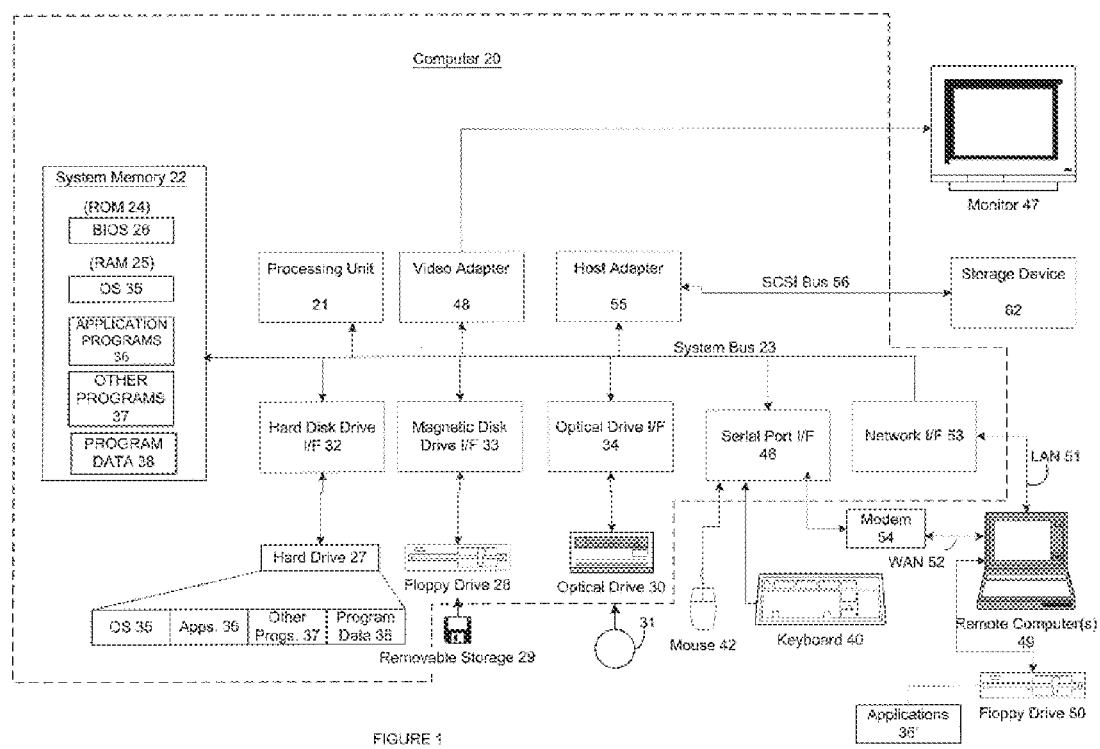
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2A:
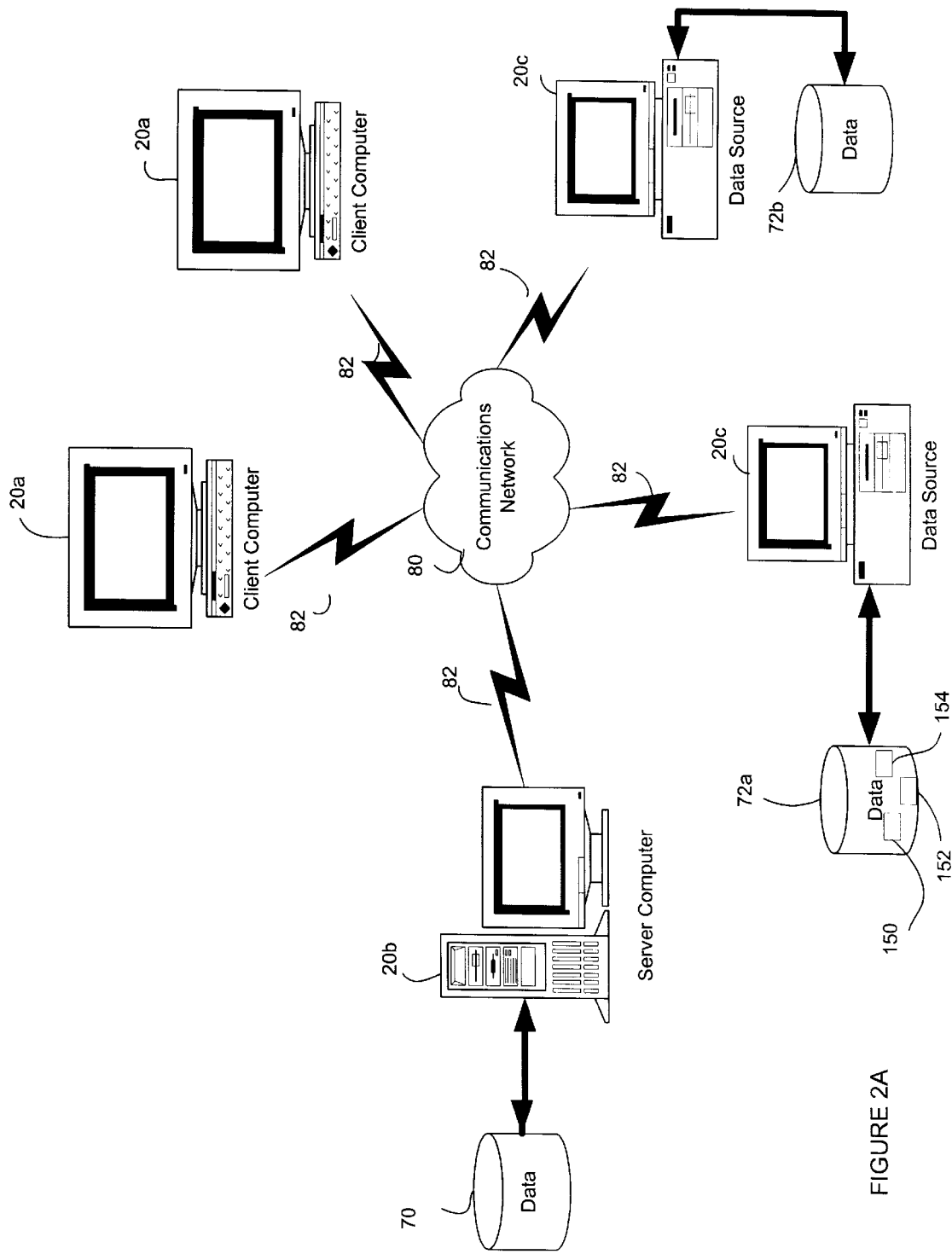
FIG. 2A is schematic diagram representing a network in which aspects of the present invention may be incorporated.

FIG. 2 illustrates an exemplary network environment in which the present invention may be is employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

3. Database Architecture

Figure 2B:
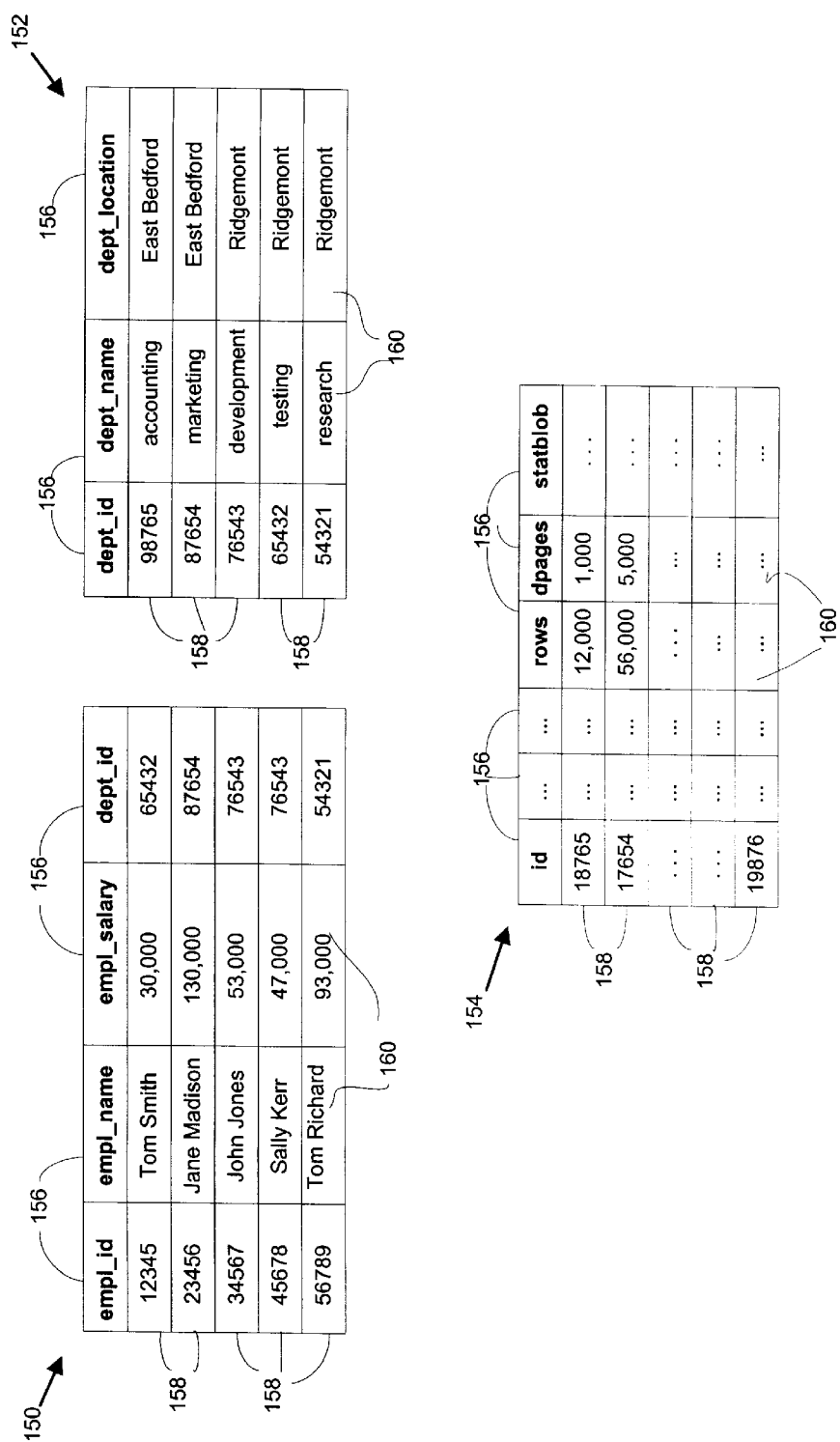
FIG. 2B is a diagram representing tables in an exemplary database.

A database is a collection of related data. In one type of database, a relational database, data is organized in a two-dimensional column and row form called a table. FIG. 2B illustrates tables such as tables 150, 152, and 154 that are stored in database 72a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

As shown in FIG. 2B, the exemplary database is 72a comprises employee table 150, department table 152, and sysindexes table 154. Each table comprises columns 156 and rows 158 with fields 160 formed at the intersections. Exemplary employee table 150 comprises multiple columns 158 including empl_id, empl_name, and empl_salary, dept_id. Columns 158 in department table 152 include dept_id, dept_name, and dept_location.

Sysindexes table 154 contains information regarding each table in the database.

Generally, data stored in a relational database is accessed by way of a user-defined query that is constructed in a query language such as SQL. Typically, for any given SQL query there are numerous procedural operations that need be performed on the data-in order to carry out the objectives of the SQL query. For example, there may be numerous joins and table scans that need to be performed so as to accomplish the desired objective.

Figure 3:
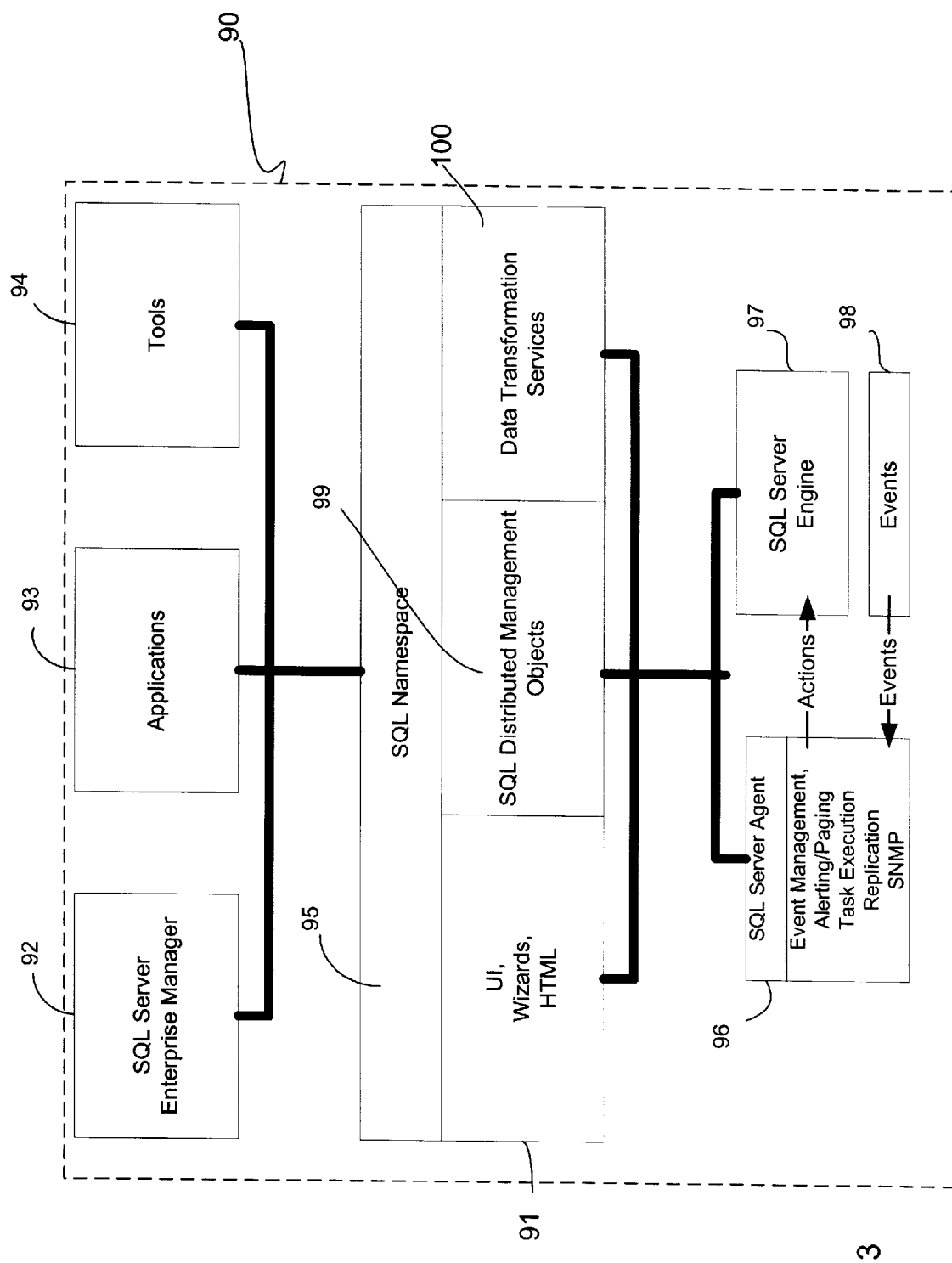
FIG. 3 is an architecture of an exemplary database management system.

As noted control and management of the tables is maintained by a DBMS, e.g., a RDBMS. An exemplary SQL Server RDBMS architecture 90 is graphically depicted in FIG. 3. The architecture comprises essentially three layers. Layer one provides for three classes of integration with the SQL Server, comprising: (1) a SQL Server Enterprise Manager 92 that provides a common environment for managing several types of server software in a network and provides a primary interface for users who are administering copies of SQL Server on the network; (2) an Applications Interface 93 that allows integration of a server interface into user applications such as Distributed Component Object Modules (DCOM); and (3) a Tools Interface 94 that provides an interface for integration of administration and configuration tools developed by Independent Software Vendors (ISV).

Layer two opens the functionality of the SQL server to other applications by providing three application programming interfaces (API): SQL Namespace 95, SQL Distributed Management Objects 99, and Data Transformation Services 100. A user interface 91 is provided by Wizards, HTML, and so on. SQL Namespace API 95 exposes the user interface (UI) elements of SQL Server Enterprise Manager 92. This allows applications to include SQL Server Enterprise Manager UI elements such as dialog boxes and wizards.

SQL Distributed Management Objects API 99 abstracts the use of DDL, system stored procedures, registry information, and operating system resources, providing an API to all administration and configuration tasks for the SQL Server.

Distributed Transformation Services API 100 exposes the services provided by SQL Server to aid in building data warehouses and data marts. As described more fully below, these services provide the ability to transfer and transform data between heterogeneous OLE DB and ODBC data sources. Data from objects or the result sets of queries can be transferred at regularly scheduled times or intervals, or on an ad hoc basis.

Layer three provides the heart of the SQL server. This layer comprises an SQL Server Engine 97 and a SQL Server Agent 96 that monitors and controls SQL Server Engine 97 based on Events 98 that inform SQL Server Agent of the status of the SQL Server Engine 97. The Server Engine processes SQL statements, forms and optimizes query execution plans, and so on.

Logical Database Application

Figure 4:
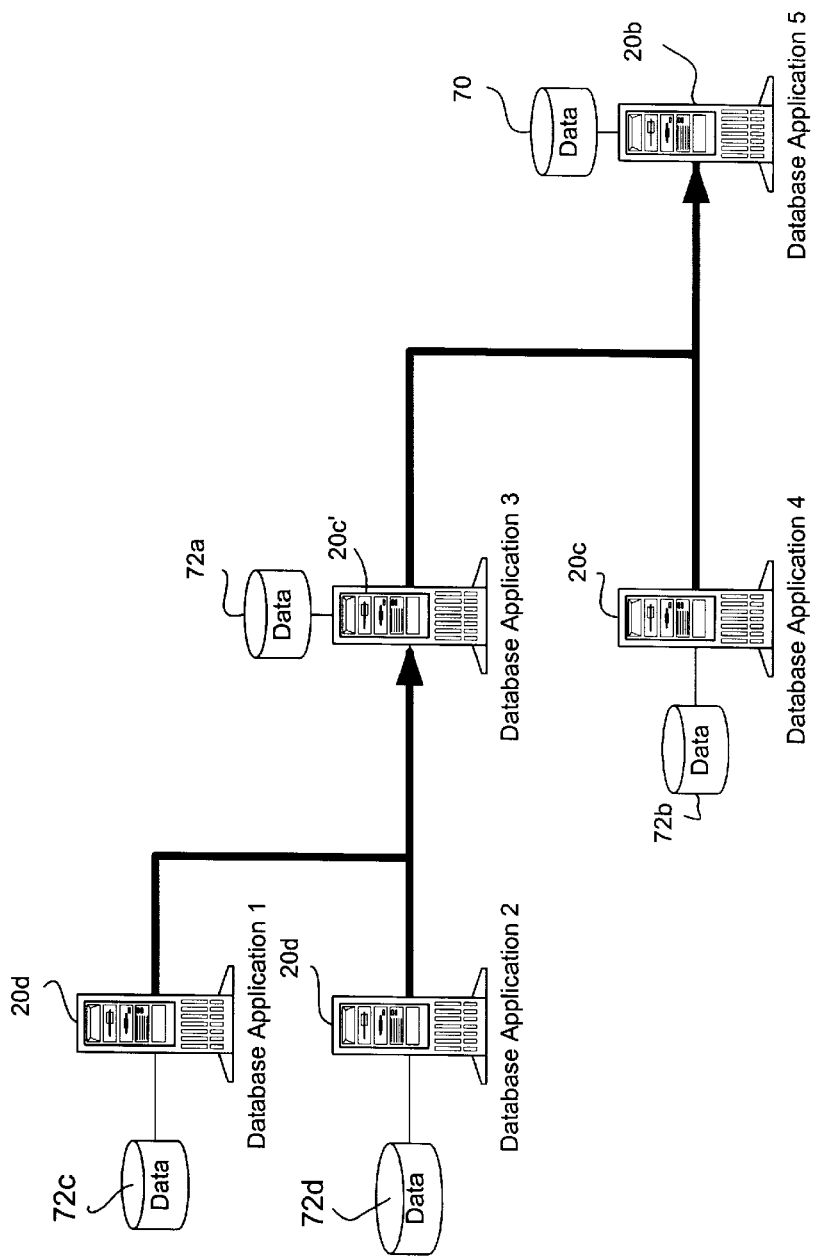
FIG. 4 is a network of database systems depicting the logical flow of data.

The above description focused on physical attributes of an exemplary database environment in which the present invention operates. FIG. 4 logically illustrates the manner in which data moves among a number is of database servers, which may simultaneously be data sources for other database servers, to the destination database.

Here, Database server 20b provides management of database 70. Data for database 70 is provided by data sources 72a and 72b, which are managed by database servers 20c' and 20c, respectively. Significantly, database 20c' gathers data from databases 72c and 72d, which are managed by servers 20d. Thus, database 70 is fed directly with data from databases 72a and 72b and indirectly with data from databases 72c and 72d.

According to an aspect of the present invention, data moving through several systems toward a destination database can be traced. For example, in the exemplary system of FIG. 4, data from database 72c moves through database 72a and then on to database 70. Along the way, the data may also undergo transformation. As described more fully below, data lineage information may be attached to data as it moves through systems thereby allowing the history and origin of data to be traced. For example, the data lineage information might indicate that data stored in database 70 data originated from database 72a, 72b, 72c, 72d, and so on. Moreover, the lineage information could indicate that data originated in database 72c, passed through database 72a and then moved to database 70. The above examples, merely illustrate the general concept of tracing data movement though several hops before reaching a database server of interest. Those skilled in the art will recognize that many other combinations of movement and transformation of data is possible.

Figure 5:
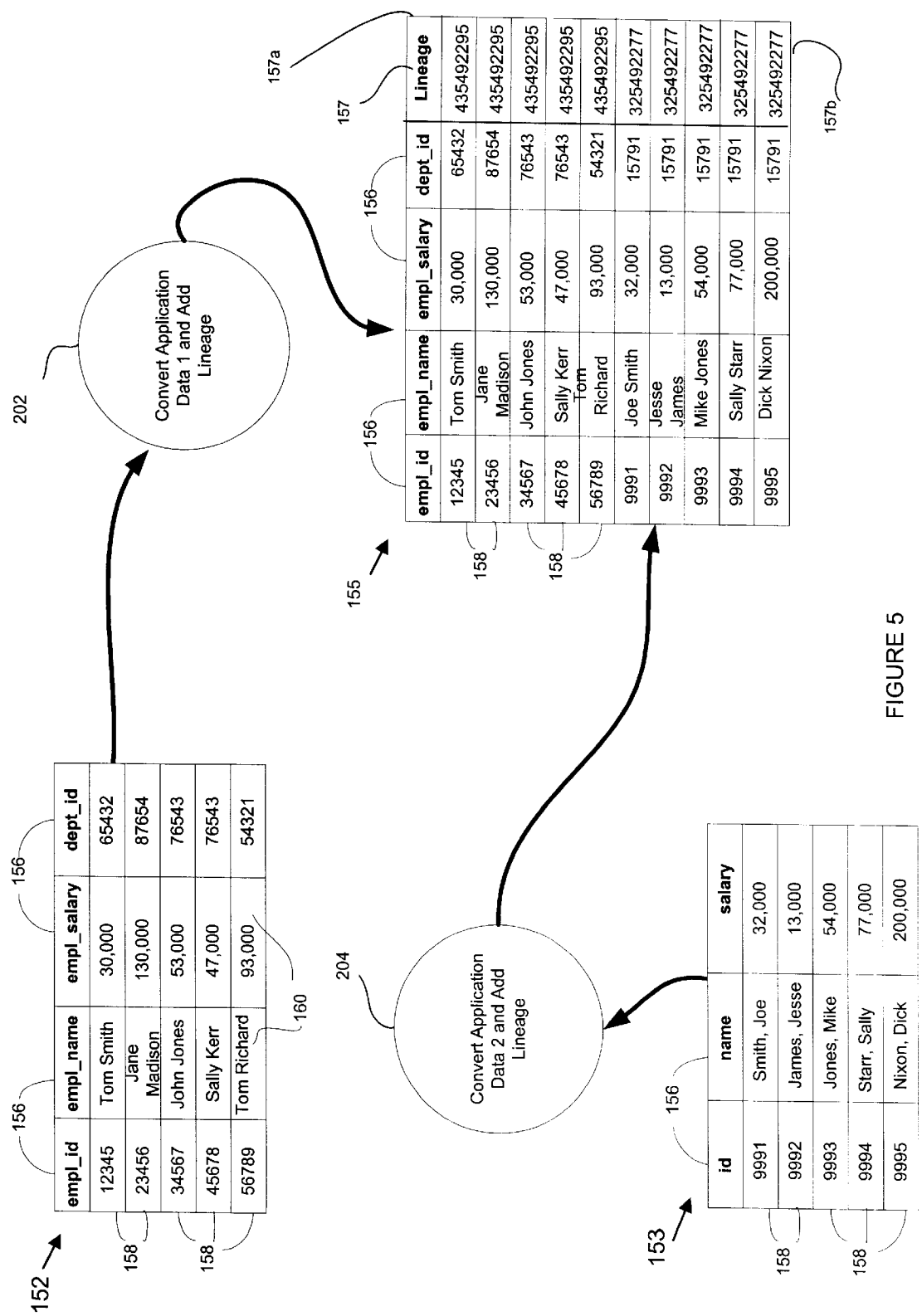
FIG. 5 is a diagram showing the transformation of data as it moves between databases.

As described above, data lineage may track the movement of data, the transformation of data, or both. Data lineage tags the information as it moves throught the system. FIG. 5 illustrates one such transformation. In this exemplary transfer, data is merged from two different tables that reside in two different databases into a third table residing in a third database. For example, table 150 resides in database 72a whereas table 149 resides in database 72b. The tables are merged into a third table 151 that is maintained in database 70.

Although both tables 149, 150 contain similar information, it is not in an identical format. As a result, the data must be transformed into the format of table 151. For example, table 150 maintains a column empl_name that contains employee names as first name followed by last name; whereas, table 149 maintains a column name that contains employee names as last name followed by first name. Table 151 contains employee names in the form of table 150. In order for the name columns of table 149 to be inserted into the empl_name column of table 151, the name must be converted to the proper form. Similarly, table 149 does not contain dept_id information.

The above example illustrates that data moving between databases may need to be transformed in some manner before insertion into the target database. In FIG. 5, for example, transformation application 204 transform the data of table 149 into proper form for table 151 and transformation application 202 transforms the data of table 150 into proper form for table 151.

A user of the data contained in table 151 may want to trace the lineage of the data for the purpose of verifying its accuracy, tracing it source, and so on. To, that end table 151 contains an additional column 157. Lineage column 157 contains information to provide a link to the lineage of the data. In the present example, notice that each row that passes through transform 202 is is appended with the same unique data lineage value. Each row passing through transform 204 is appended with a unique identifier that is different from the identifier associated with the rows originating from table 150.

The data lineage information attached to the data is preferably stored as a data lineage data type. A data lineage data type comprises a globally unique identifier that is assigned to a row of data in a table. The globally unique identifier preferably uniquely identifies data as having a particular lineage, preferably on at least a table level, and more preferably on a row level. Hence, two or more rows of data having identical data lineage values will have a common lineage.

Referring to FIG. 5, for example, data lineage value "435492295" identifies one set of rows sharing a common lineage and "32549227" identified another set of rows sharing a common lineage. Based on this example, a user comparing a row having lineage value "435492295" and a row having a lineage value "32549227" can know at least that the two rows have origins in different tables.

Figure 6:
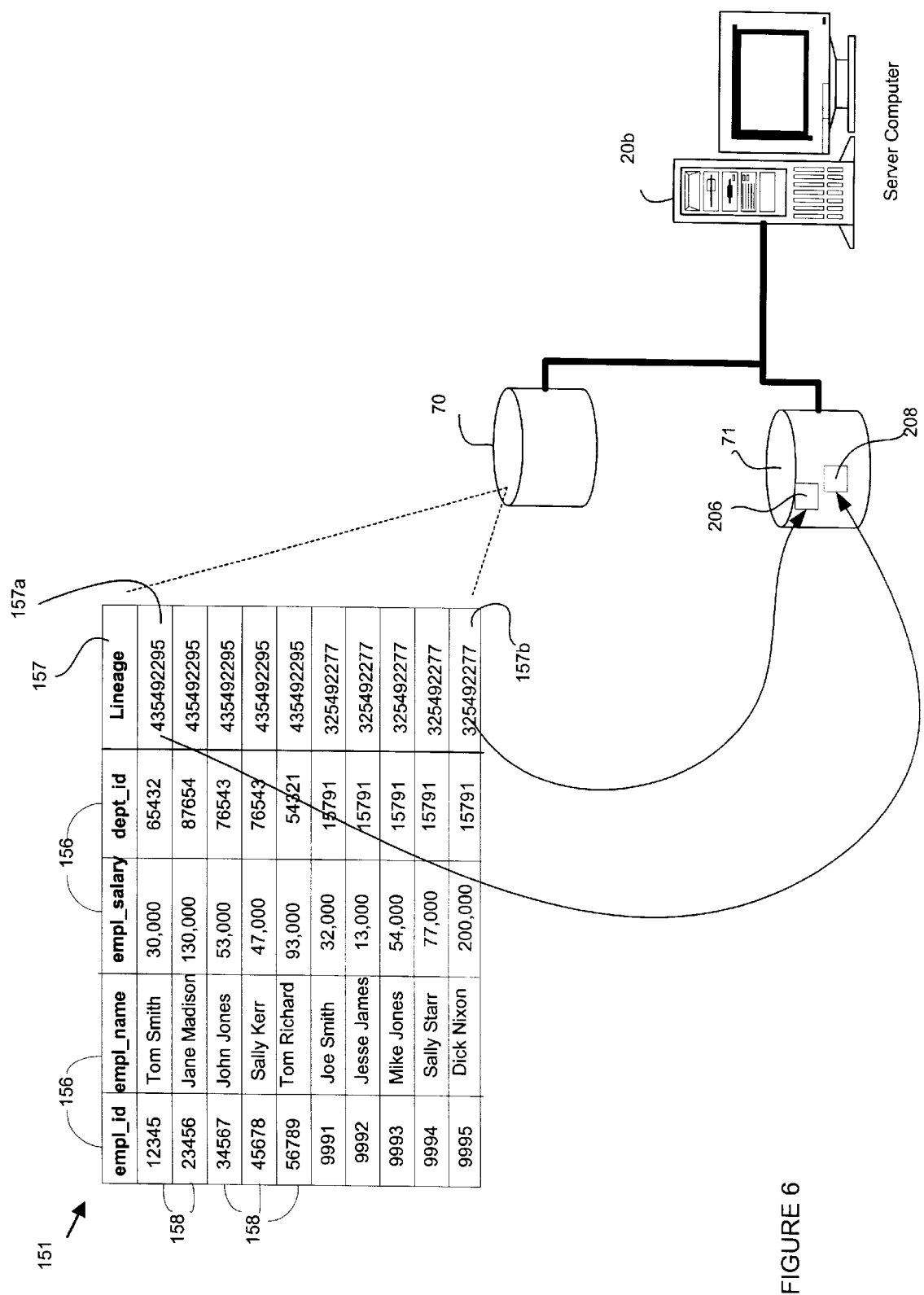
FIG. 6 is a diagram of the binding of data lineage information to rows of data in a database.

According to another aspect of the present invention, the data lineage data type can contain a value that points to an object containing lineage additional lineage information. Referring to FIG. 6, this further aspect of data lineage is illustrated. Again, table 151 having a data lineage data type column appended to the data is shown.

Table 151 is stored in database 70, which is maintained by server computer 20b. Also coupled to server computer 20b is an object repository 71 which may be maintained as part of database 70 but which is preferably maintained as a separate database. Repository 71 contains two exemplary objects, 206 and 208. Object 206 is pointed to by data lineage value "435492295" and object 208 is pointed to by data lineage value "32549227." That is, having the unique data lineage value, a corresponding data lineage object can be located in repository 71. By examining the contents of the corresponding data lineage object, further data lineage information is provided for all data that is bound to that data lineage object.

The data lineage object preferably contains the source data base tables from which the row of interest was formed and the transformation that was used to move the data from the source row and change the data before moving it into the row of interest. Preferably, the data lineage object comprises a package as exemplified in FIG. 7.

Figure 7:
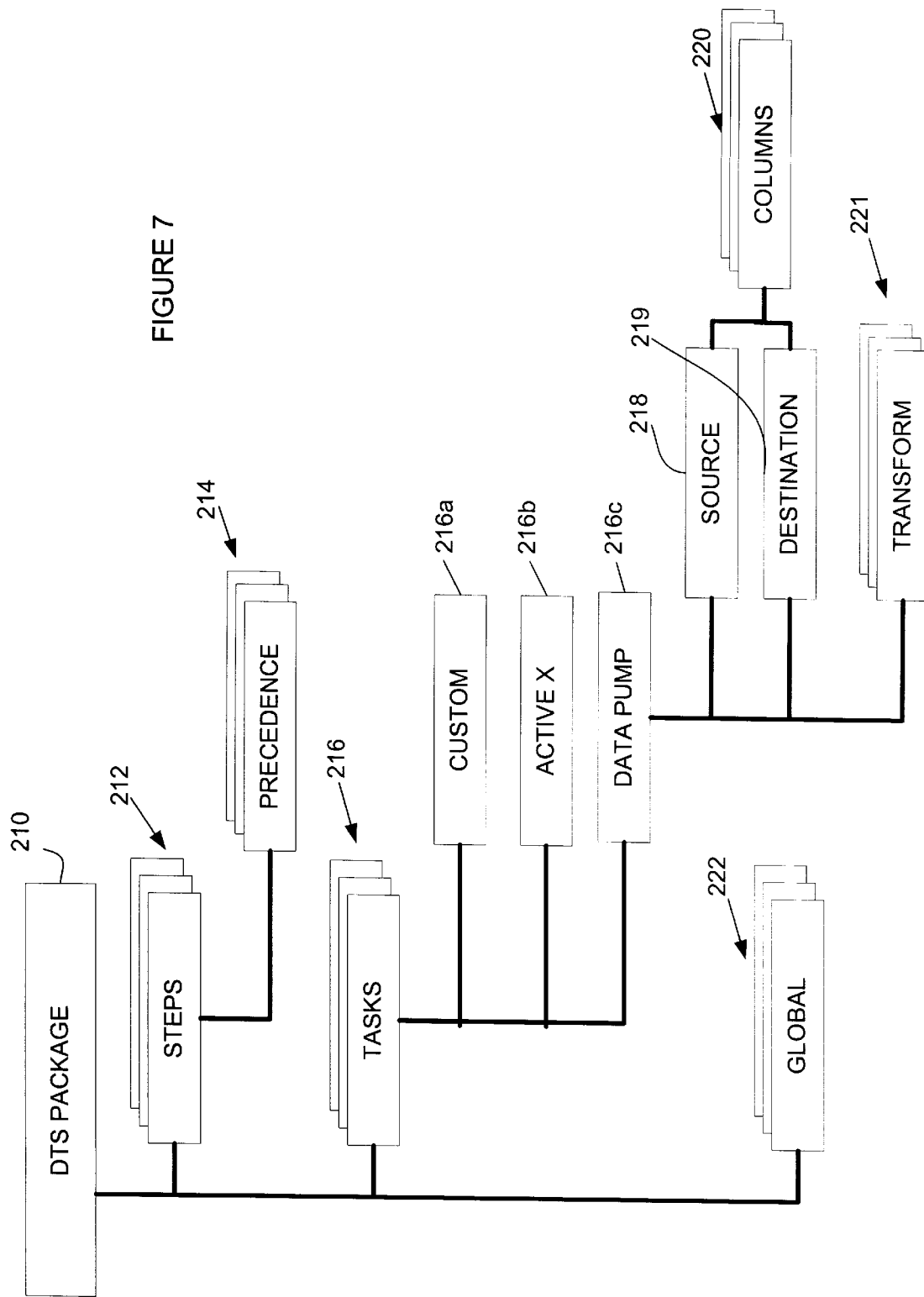
FIG. 7 is a functional diagram of a data transformation package.

As illustrated in FIG. 7, each package comprises a steps 212 that convert the data among formats (e.g., convert from spread sheet to database form), task(s) 216 that transform the data to a format of the destination table, and global variables 222 that are available system wide. Steps 212 define a set of precedence 214 that must be performed on the data in a particular order before the data can be operated upon. That is, each step 212 is a set of instructions that operate on the data. However, the execution of some of the steps 212 are selectively conditioned on the successful completion of other steps 212.

Once the data is in a usable format, transformation tasks 216 transform the data before moving it to the destination row (e.g., see FIG. 5 showing the conversion of name in table 149). The tasks could be custom procedural scripts, ActiveX® scripts, or, as described more fully below data pump connections. The task defines the source table 218, the destination table 219, and corresponding columns that join the two tables together. And, the transformation algorithm 221 defines how the data is changed.

Figure 8B:
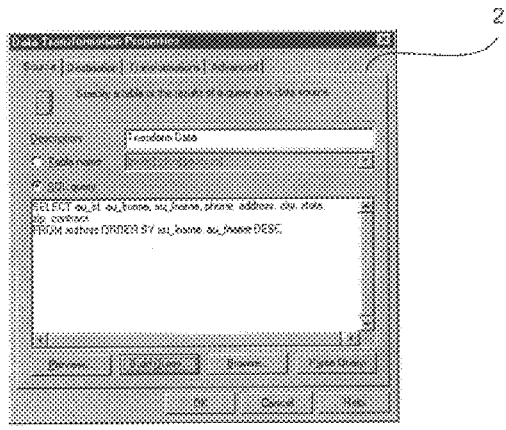
FIGS. 8A–8C are depictions of a graphical interface for attaching data lineage information to data imported into a database.
Figure 8C:
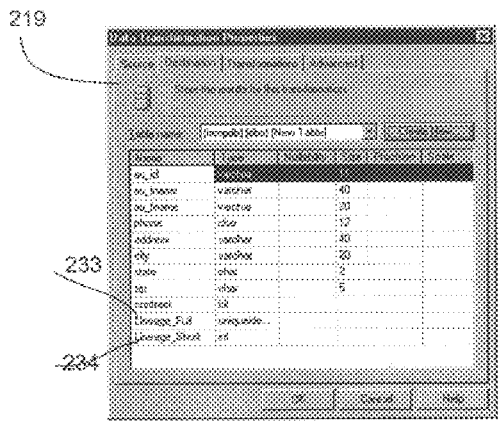
Figure 8A:
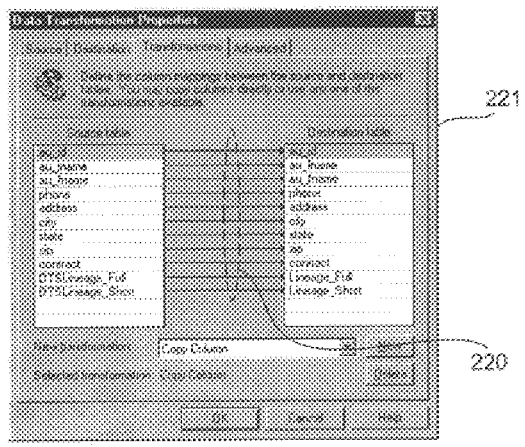

FIGS. 8A–8C show an exemplary transform for moving data from an external source table (e.g., from database 72a) into a destination table (e.g., to database 70) while adding data lineage information by way of the "data pump". Here, dialog boxes corresponding to package boxes 218, 219, and 221 are provided that graphically allows users to import and transform data. In FIG. 8B, a user can define the selected rows of the selected table to import. Here, a definition is provided by way of an SQL query. In FIG. 8C, a user can define a destination table to accept the data to be imported. Finally in FIG. 8A, a user can define the relationship of source to destination rows as indicated by arrow 220 and select a predefined transformation to apply to the data during the importation. Here, a simple row copy has been selected. Notably, two columns have been added to the destination column: Lineage_Full 233; and Lineage_Short 234.

Lineage_Full contains a unique identifier as described in detail above. Lineage_Short is an integer number. As a result, as the data is moved into the destination table, the system automatically adds the data lineage value for each row passing through the transform 221. Before or after the transform is complete, a copy of the package is stored in repository 71 (See FIG. 6). Thereafter, at any time in the future, a user can retrieve and view the exact package that was used to transform the data as it moved into the database by using the lineage pointer to recover the package from the repository.

FIG. 9 illustrates a simple VISUAL BASIC® transformation script 216*b* that performs the same function as the graphical importation described above in reference to FIGS. 8A–8C. As with the UI package described above. The VISUAL BASIC transform forms part of a package 210 that is also stored in repository 71 and pointed to by the data lineage value for all rows that it transformed.

Figure 10:
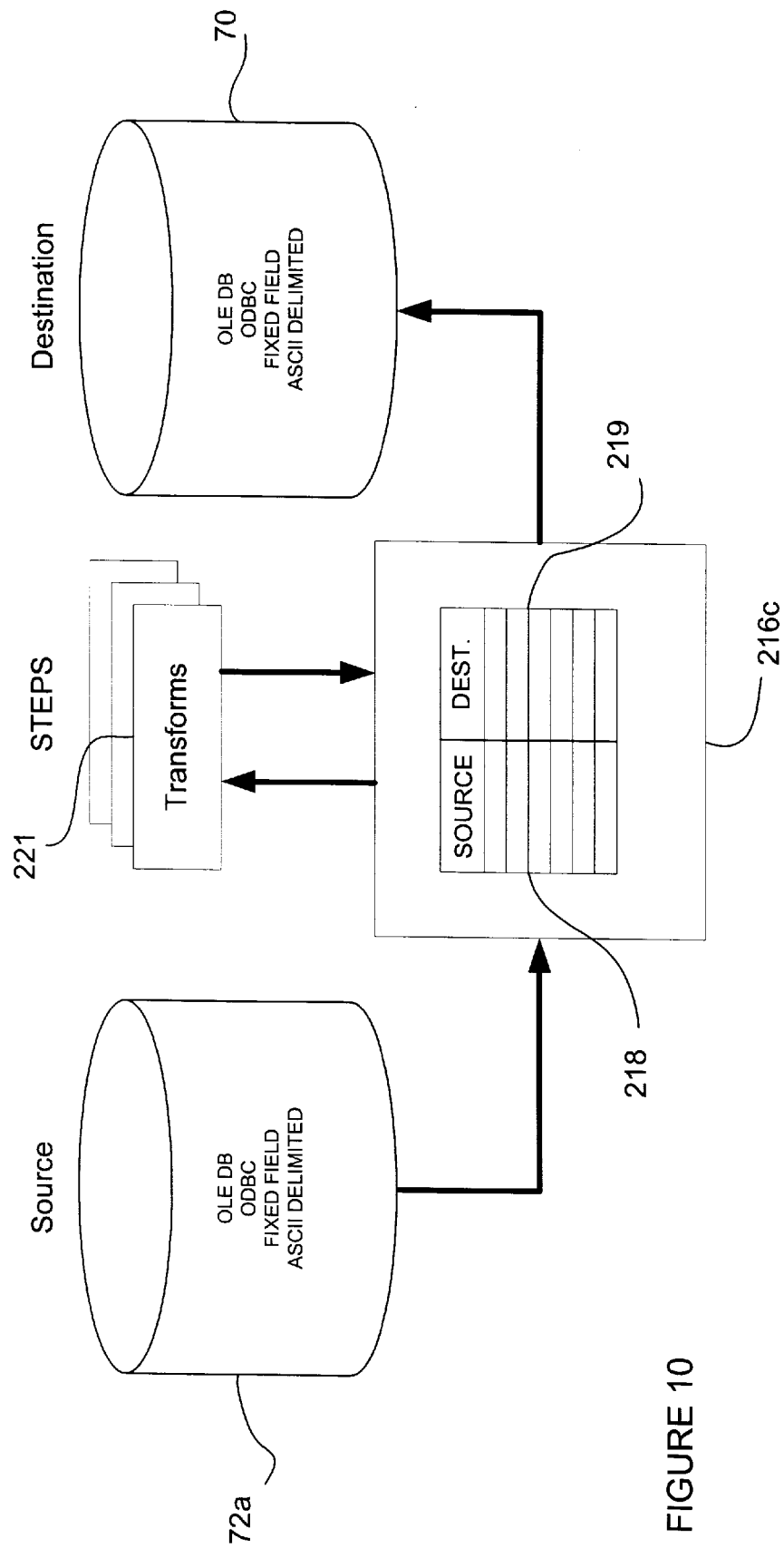
FIG. 10 is a data pump architecture for importing data into a database.

The data lineage information is added as data is imported into the destination database, e.g., database 70. FIG. 10 schematically depicts the architecture of adding data lineage information to incoming data by way of a streaming system referred to previously as a "data pump" 216*c*. As each row is pulled from source database, e.g., 72*a* into data pump 216*c*, a transform 221 is applied and data lineage information is bound to the data. The information is then pumped out into the destination database 70.

Figure 11:
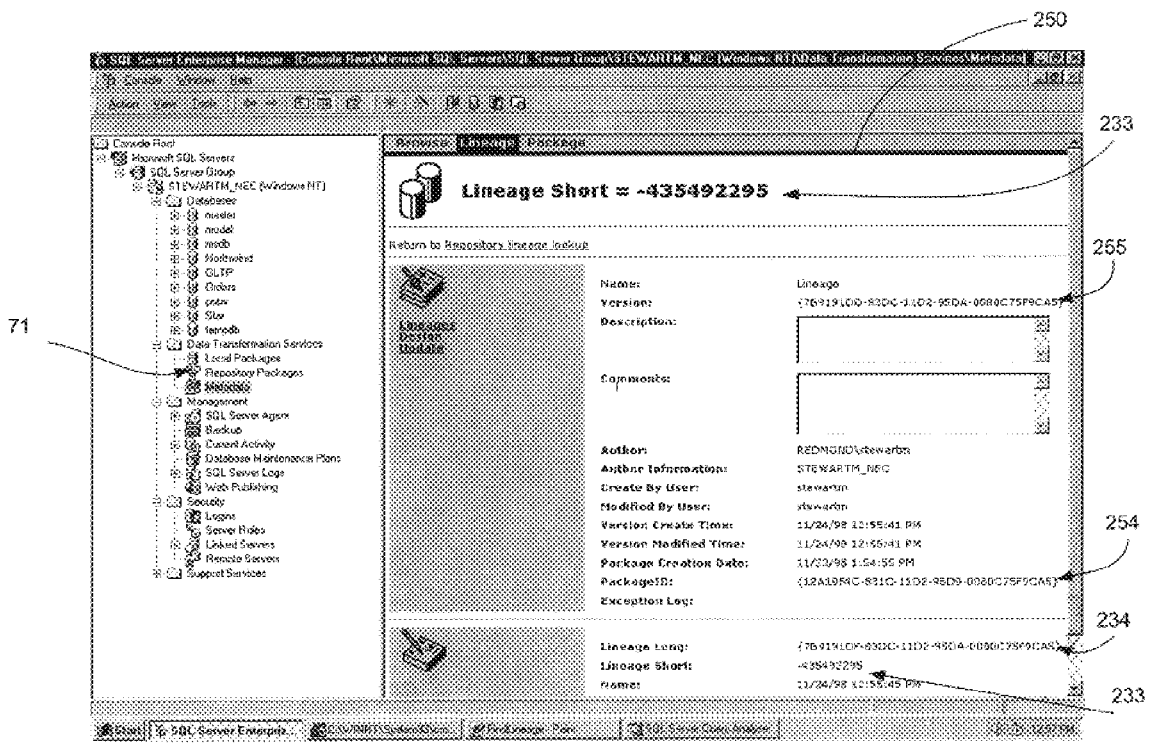
FIG. 11 is a window showing data lineage information attached to a row of data.

After the data lineage information is stored in the repository and linked to the data stored in the database, a user can use the data lineage to trace the history of data. FIG. 11 illustrates a lineage WINDOW 250 that is displaying lineage information for a selected exemplary Lineage_Short 233 value, i.e., "–435492295." WINDOW 250 displays an associated Lineage_Long 234 value, a Package identifier 254, and a Package version identifier 255. The Package and Package Version identifiers 254, 255 can then be used to browse in repository 71 for the procedure used to transform the data associated with the selected lineage value.

Package version identifier 255 indicates the particular version of the procedure. Thus, as a particular package is modified, the data lineage will still be able to recover the procedure that transformed particular data using well known versioning techniques.

Those skilled in the art understand that computer readable instructions for performing the above described processes can be generated and stored on a computer readable medium such as a magnetic disk or CD-ROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

In summary, a system for tracking the lineage of data as it moves through a network of databases has been described. The system function by attaching an identifier to data as it is imported into a database. The specific example above illustrated how the data lineage information is attached for importation into a single database. However, data can be tracked over several "hops" among databases by repeatedly tagging a data lineage identifier to the data during the importation into each database along the path that the data travels. In that way, the source of data can be traced over a plurality of databases.

While the invention has been described and illustrated with reference to specific embodiments, those skilled in the art will recognize that modification and variations may be made without departing from the principles of the invention as described above and set forth in the following claims. In particular, the invention may employed with any type of database including those not in relational format. Further, the invention may be employed in any database that uses statistics in any way to select a plan for processing a user defined query. Also, the statistics may be of any type and are not limited to those described above. Indeed, the statistics may be derived for single columns of data, multiple columns of data or for any other division of data. Accordingly, reference should be made to the appended claims as indicating the scope of the invention.

What is claimed is:

1. A system for collecting and managing data, comprising:

A server computer being couplable to at least one data source by way of a computer network;

a database management system operating on said server computer; and a data import facility for selecting data from said at least one data source and storing the selected data in a format useable by said database management system;

said import facility comprising a data lineage attachment mechanism for generating and attaching a value indicative of a source of data when data is imported into the database management system.

2. The system as recited in claim 1 wherein said network comprises an Internet.

3. The system as recited in claim 1 wherein said network comprises an Intranet.

4. The system as recited in claim 1 wherein said database management system comprises a relational database management system.

5. The system as recited in claim 4 wherein said relational database management system comprises a SQL server.

6. The system as recited in claim 4 wherein said value comprises a unique identifier that is changed each the import facility operates on a data source.

7. The system as recited in claim 4 further comprising a selected program module for transforming data from the at least one data source wherein the data lineage value is indicative of the selected program module.

8. The system as recited in claim 7 wherein said data lineage value provides a link to the location of the program modules in the repository.

\* \* \* \* \*

UNITED STATES PATENT AND TRADEMARK OFFICE
CERTIFICATE OF CORRECTION

PATENT NO. : 6,343,295 B1
DATED : January 29, 2002
INVENTOR(S) : Stewart P. MacLeod et al.

It is certified that error appears in the above-identified patent and that said Letters Patent is hereby corrected as shown below:

Column 7,
Line 63, delete "lineage" after "containing";

Column 8,
Line 20, delete "a" after "comprises";

Column 9,
Line 4, delete "above. The" and insert -- above, the -- therefor;
Line 46, delete "function" and insert -- functions -- therefor;

Column 10,
Line 8, insert "be" after "may"

Signed and Sealed this

Twenty-first Day of May, 2002

JAMES E. ROGAN
*Director of the United States Patent and Trademark Office*

*Attest:*

*Attesting Officer*

UNITED STATES PATENT AND TRADEMARK OFFICE
CERTIFICATE OF CORRECTION

PATENT NO. : 6,343,295 B1
DATED : January 29, 2002
INVENTOR(S) : Stewart P. MacLeod et al.

It is certified that error appears in the above-identified patent and that said Letters Patent is hereby corrected as shown below:

Title page,
Item [56], References Cited, OTHER PUBLICATIONS, please delete "ExploITing" and insert -- Exploiting -- therefor;

Column 1,
Line 43, delete "originate" and insert -- originated -- therefor;

Column 2,
Line 33, insert -- a -- after "is";

Column 4,
Line 46, delete "is" after "be";

Column 5,
Line 47, delete "and" after "empl_name,";
Line 47, insert -- and -- after "empl_salary,";

Column 6,
Line 42, delete "is" after "number";

Column 7,
Line 30, delete "transform" and insert -- transforms -- therefor;
Line 36, delete "," after "To" therefor;
Line 40, delete the first occurrence of "is";
Line 63, delete "lineage" after "containing";

Column 8,
Line 20, delete "a" after "comprises";

Column 9,
Line 4, delete "above. The" and insert -- above, the -- therefor;
Line 46, delete "function" and insert -- functions -- therefor;

UNITED STATES PATENT AND TRADEMARK OFFICE
CERTIFICATE OF CORRECTION

PATENT NO. : 6,343,295 B1
DATED : January 29, 2002
INVENTOR(S) : Stewart P. MacLeod et al.

It is certified that error appears in the above-identified patent and that said Letters Patent is hereby corrected as shown below:

<u>Column 10,</u>
Line 8, insert "be" after "may"

This certificate supersedes Certificate of Correction issued May 21, 2002.

Signed and Sealed this

Nineteenth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,343,295 B1  Page 1 of 1
DATED : January 29, 2002
INVENTOR(S) : Stewart P. MacLeod, Casey L. Kiernan and Vij Rajarajan It is certified that error appears in the above-identified patent and that said Letters Patent is hereby corrected as shown below:

Column 10,
Line 43, insert -- time -- after "each".

Signed and Sealed this

Twenty-seventh Day of April, 2004

JON W. DUDAS
*Acting Director of the United States Patent and Trademark Office*